(12) United States Patent
Winoto et al.

(10) Patent No.: US 11,780,777 B2
(45) Date of Patent: *Oct. 10, 2023

(54) ELECTROCHROMIC DEVICE INCLUDING LITHIUM-RICH ANTI-PEROVSKITE MATERIAL

(71) Applicant: HIVISQ TECHNOLOGIES, SOCIEDAD LIMITADA, Bilbao (ES)

(72) Inventors: Adrian Winoto, San Jose, CA (US);
Douglas Weir, Alameda, CA (US);
Guillermo Garcia, Oakland, CA (US);
Jason K. Holt, Larkspur, CA (US);
Amir Bayati, Santa Clara, CA (US);
Bonil Koo, Walnut Creek, CA (US);
Hai Wang, Dublin, CA (US)

(73) Assignee: HIVISQ TECHNOLOGIES SOCIEDAD LIMITADA, Bilbao (ES)

( * ) Notice: Subject to any disclaimer, the term of this patent is extended or adjusted under 35 U.S.C. 154(b) by 0 days.

This patent is subject to a terminal disclaimer.

(21) Appl. No.: 17/658,688

(22) Filed: Apr. 11, 2022

(65) Prior Publication Data
US 2022/0234960 A1    Jul. 28, 2022

Related U.S. Application Data

(63) Continuation of application No. 16/883,000, filed on May 26, 2020, now Pat. No. 11,299,429, which is a
(Continued)

(51) Int. Cl.
*G02F 1/155* (2006.01)
*G02F 1/1523* (2019.01)
(Continued)

(52) U.S. Cl.
CPC .......... *C04B 35/5152* (2013.01); *B32B 9/005* (2013.01); *B32B 17/06* (2013.01);
(Continued)

(58) Field of Classification Search
CPC ...... G02F 1/1514; G02F 1/1523; G02F 1/155; B32B 9/005; C04B 2235/3203
(Continued)

(56) References Cited

U.S. PATENT DOCUMENTS 9,246,188 B2    1/2016    Zhao et al.
10,698,287 B2   6/2020    Winoto et al.
(Continued)

FOREIGN PATENT DOCUMENTS

CN        104466239 A       3/2015
WO     WO 2016/131008 A1    8/2016
WO     WO 2017/059364 A1    4/2017

OTHER PUBLICATIONS

EPO Office Communication, Office Action and Extended European Search Report for European Patent Application No. 18817104.5-1210, dated Feb. 10, 2021, 10 pages.
(Continued)

*Primary Examiner* — Zachary W Wilkes
(74) *Attorney, Agent, or Firm* — THE MARBURY LAW GROUP PLLC

(57) ABSTRACT

An electrochromic device includes a light transmissive first substrate, a working electrode disposed on the first substrate, a light transmissive second substrate facing the first substrate, a counter electrode disposed on the second substrate, and a lithium-rich anti-perovskite (LiRAP) material disposed between the first and second substrates. The LiRAP material includes an ionically conductive and electrically insulating LiRAP material.

7 Claims, 5 Drawing Sheets

Related U.S. Application Data continuation of application No. 16/007,488, filed on Jun. 13, 2018, now Pat. No. 10,698,287.

(60) Provisional application No. 62/520,077, filed on Jun. 15, 2017.

(51) Int. Cl.

| | | |
|---|---|---|
| *C04B 35/515* | (2006.01) | |
| *E06B 9/24* | (2006.01) | |
| *E06B 3/67* | (2006.01) | |
| *B32B 18/00* | (2006.01) | |
| *B32B 17/06* | (2006.01) | |
| *B32B 9/00* | (2006.01) | |
| *C04B 35/553* | (2006.01) | |

(52) U.S. Cl.
CPC ............ *B32B 18/00* (2013.01); *C04B 35/553* (2013.01); *E06B 3/6722* (2013.01); *E06B 9/24* (2013.01); *G02F 1/155* (2013.01); *G02F 1/1523* (2013.01); *B32B 2255/205* (2013.01); *B32B 2255/26* (2013.01); *B32B 2307/202* (2013.01); *B32B 2307/412* (2013.01); *B32B 2307/71* (2013.01); *C04B 2235/3203* (2013.01); *C04B 2237/704* (2013.01); *E06B 2009/2464* (2013.01); *G02F 2001/1555* (2013.01); *G02F 2201/086* (2013.01)

(58) Field of Classification Search
USPC .................................................. 359/265–275
See application file for complete search history.

(56) References Cited

U.S. PATENT DOCUMENTS

| | | |
|---|---|---|
| 2011/0151283 A1* | 6/2011 | Gillaspie ............... H01M 4/505 |
| | | 429/188 |
| 2013/0202971 A1 | 8/2013 | Zhao et al. |
| 2014/0113187 A1 | 4/2014 | Winoto et al. |
| 2015/0364788 A1 | 12/2015 | Lu et al. |
| 2016/0139475 A1* | 5/2016 | Garcia .................... C03C 17/23 |
| | | 29/829 |
| 2017/0097551 A1 | 4/2017 | Garcia et al. |
| 2018/0006306 A1* | 1/2018 | Zhu ...................... H01G 9/0425 |
| 2018/0364540 A1 | 12/2018 | Winoto et al. |
| 2020/0285125 A1 | 9/2020 | Winoto et al. |

OTHER PUBLICATIONS

International Search Report and Written Opinion of the International Search Authority for International Patent Application No. PCT/US2018/037259, dated Sep. 28, 2018, 12 pages.

Gao, J. et al., "Lithium-ion Transport in Inorganic Solid State Electrolyte," Chin. Phys. B, vol. 25, No. 1, pp. 1-35, (2016).

Notification Concerning Transmittal of International Preliminary Report on Patentability and Written Opinion of the International Search Authority for International Patent Application No. PCT/US2018/037259, dated Dec. 26, 2019, 9 pages.

Schwering, G. et al., "High Lithium Ionic Conductivity in the Lithium Halide Hydrates Li3-n(OHn)Cl (0.83<n<2) and Li3-n(OHn)Br (1<n<2) at Ambient Temperatures," Chemphyschem 2003, vol. 4, pp. 343-348, (2003).

Zhao, Y. et al., "Superionic Conductivity in Lithium-Rich Anti-Perovskites," Journal of the American Chemical Society 2012, vol. 134, pp. 15042-15047, (2012).

Office Communication from European Patent Office, Communication Pursuant to Article 94(3) EPC for European Patent Application 18817104.5-1020 , dated Feb. 23, 2023, 4 pages.

\* cited by examiner

ELECTROCHROMIC DEVICE INCLUDING LITHIUM-RICH ANTI-PEROVSKITE MATERIAL

CROSS REFERENCE TO RELATED APPLICATIONS

This application is a continuation of U.S. application Ser. No. 16/883,000 filed on May 26, 2020, which is a continuation of U.S. application Ser. No. 16/007,488, filed on Jun. 13, 2018, which claims the benefit of priority to U.S. Provisional Application Ser. No. 62/520,077, filed Jun. 15, 2017, the entire content of the foregoing applications are incorporated herein by reference.

FIELD

The present invention is generally directed to electrochromic (EC) devices including a lithium-rich anti-perovskite (LiRAP) material configured to provide improved electrochemical stability and/or cycle life.

BACKGROUND OF THE INVENTION

Currently, static window coatings can be manufactured at relatively low cost. However, these window coatings are static and not well suited for locations with varying climates. An electrochromic (EC) window coating overcomes these limitations by enhancing the window performance in all climates. EC window coatings undergo a reversible change in optical properties when driven by an applied potential. However, performance of EC materials may degrade from use over time as a result of repeated exposure to radiation in the ultraviolet (UV) light and/or reactions between the electrolyte and electrodes of an EC device.

SUMMARY OF THE INVENTION

According to various embodiments, provided is an EC device including a light transmissive first substrate, a working electrode disposed on the first substrate, a light transmissive second substrate facing the first substrate, a counter electrode disposed on the second substrate, and a lithium-rich anti-perovskite (LiRAP) material disposed between the first and second substrates. The LiRAP material includes an ionically conductive and electrically insulating LiRAP material.

DETAILED DESCRIPTION OF THE EXEMPLARY EMBODIMENTS

Figure 1:
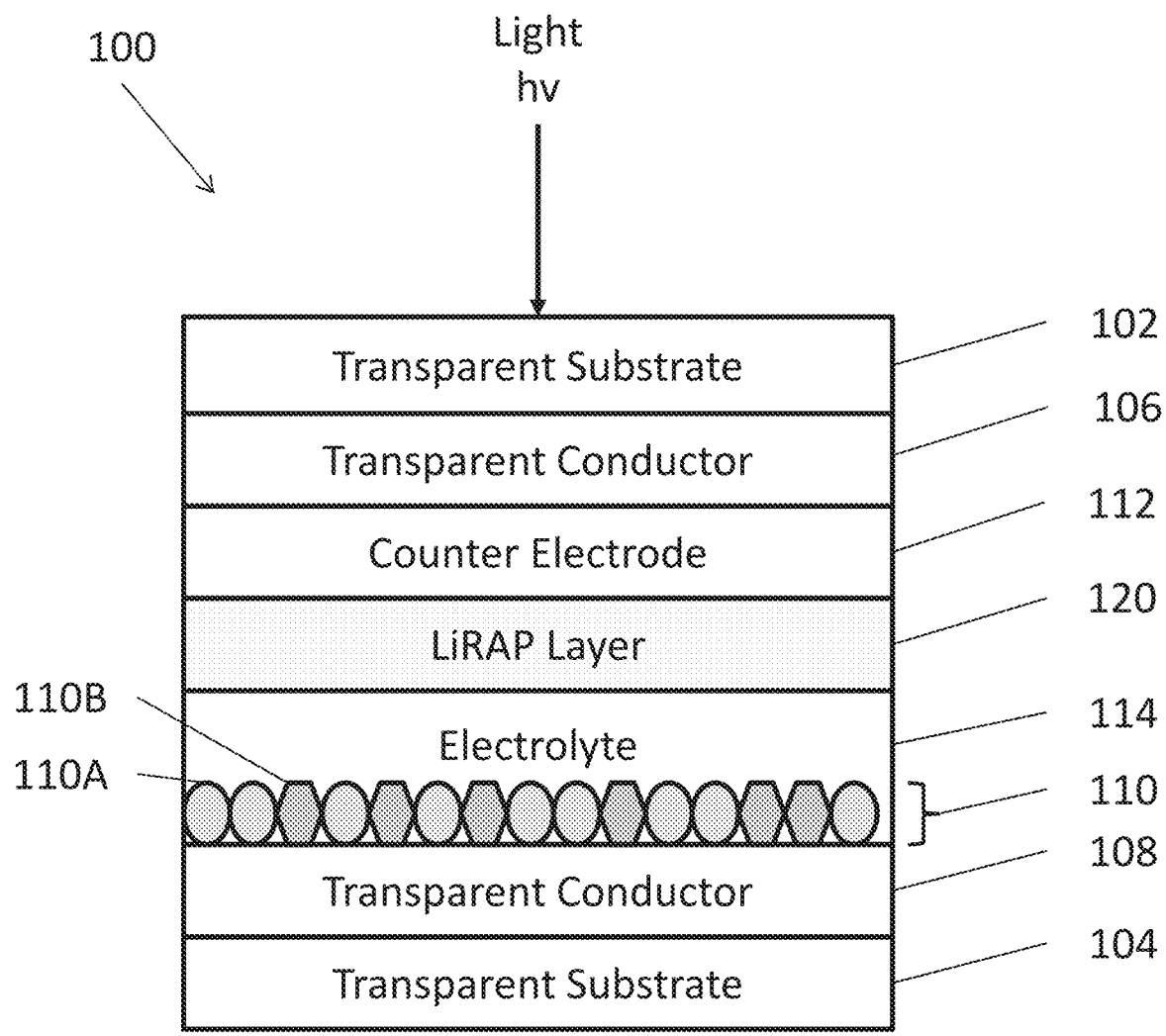
FIGS. 1-5 are schematic representations of EC devices, according to various embodiments of the present disclosure.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being disposed "on" or "connected to" another element or layer, it can be directly on or directly connected to the other element or layer, or intervening elements or layers may be present. In contrast, when an element is referred to as being disposed "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

While not intending to be bound to a particular theory, it is believed that under prolonged exposure to UV (or higher energy) radiation, an electrochromic (EC) device may undergo a visible darkening (photo-chromic darkening) that mimics the EC darkening of the EC device. In particular, the darkening may result from a photochromic effect in transition metal oxide bronze working electrodes, such as doped or undoped tungsten oxide (e.g. $WO_{3-x}$ where $0 \le x \le 0.33$), which limits the optical dynamic range of the EC device.

EC devices may also experience charge transfer fade during long-term EC cycling. It is believed that the charge transfer fade may result from side reactions between EC materials, such as nickel oxide counter electrode materials, and organic electrolyte constituents. Charge transfer fade may be compensated for by increasing the operational voltage range of an EC device. However, higher operational voltages may result in and/or increase the generation of gas bubbles at one or more electrodes of an EC device. Such gas bubbles may decrease electrolyte-electrode contact and/or reduce EC device cycle life.

LiRAP Materials

In view of the above and/or other problems, various embodiments provide EC devices that include a Li-rich anti-perovskite (LiRAP) material. An antiperovskite is a compound having a crystal structure like a conventional perovskite but with the unit cell having the positive and negative species reversed. In a perovskite structure, the unit cell is face centered cubic. The negative atoms normally sit on the face centers and positive ions sit in the corners. Additionally, there will be a third type of atom, a cation, in the center of the cubic unit cell. In an antiperovskite structure, the locations of cations and anions are reversed. In the antiperovskite structure, of the type described herein, oxygen or sulfur atoms, for example, reside at centers of the unit cell, halogen atoms sit at corners of the unit cell, and lithium ions reside in the face centers of the unit cell. It is believed that the face centered species may be the most mobile species in the unit cell.

The LiRAP material may be ionically conductive and electrically insulating. The LiRAP material may be included as a layer, coating, and/or matrix in an EC device and may operate to improve cycle lifetime and/or durability of the EC device. In some embodiments, the LiRAP material may be configured to reduce the energy difference between the valence band of metal oxide nanostructured EC material (e.g., tungsten oxide) and the oxidation potential of adjacent molecules (e.g., molecules of adjacent organic electrolyte). This reduction then reduces the driving force for electron-hole separation, promotes recombination, and reduces UV-induced photochromic darkening.

In other embodiments, the LiRAP material may be configured to reduce the generation of gas bubbles in the organic electrolyte of an EC device. The LiRAP material may be configured to aid in the retention of electrode charge, by stabilizing the oxidation state of an electrode. For example, a nickel oxide counter electrode may be "charged" by oxidizing $Ni^{2+}$ in the counter electrode to form $Ni^{3+}$, via ozonation, and the LiRAP material may be configured to prevent or reduce the reduction of $Ni^{3+}$ to $Ni^{2+}$.

According to various embodiments, EC devices may include one or more layers of the LiRAP material. The LiRAP layer may be disposed on one or more electrodes of an EC device. For example, a LiRAP layer may be disposed between the counter electrode and the electrolyte of an EC device and/or between the working electrode and the electrolyte of an EC device. In other embodiments, the LiRAP material may be incorporated into a working electrode of an EC device. For example, the LiRAP material may form a core-shell structure with the working electrode material, with particles of the working electrode being encapsulated by the LiRAP material. In other embodiments, the LiRAP material may form a matrix around particles of the working electrode material.

In some embodiments, the LiRAP material may be used as an electrolyte layer in place of a conventional electrolyte, in an EC device. As such, the generation of gas by organic constituents of conventional organic materials may be prevented. A LiRAP electrolyte layer may also operate to widen the operating voltage range of an EC device, thereby improving the dark state light-blocking properties of an EC device and/or reducing the transition time between light and dark states of an EC device.

According to various embodiments, the LiRAP material may the formula $Li_3OX$, where X may be a halogen or a combination of halogens. For example, X may be F, Cl, Br, I, or any combination thereof. In some embodiments, the LiRAP material may be $Li_3OI$. In some embodiments, the LiRAP material may also include one or more dopant species. In some embodiments, the LiRAP material may be aliovalently doped by replacing a first anion in the base structure with a second anion that has a valence more positive than that of the first atom.

The LiRAP material may be formed from constituent lithium salts. For example, the LiRAP material may be formed from an oxygen-containing lithium salt and a halogen salt of lithium. Examples of the oxygen-containing lithium salt include lithium hydroxide (LiOH) lithium acetate ($C_2H_3LiO_2$), lithium carbonate ($Li_2CO_3$), lithium oxide ($Li_2O$), lithium perchlorate ($LiClO_4$), lithium nitrate ($LiNO_3$), or any combination thereof. Examples of the halogen salt of lithium include lithium chloride (LiCl), lithium bromide (LiBr), lithium fluoride (LiF), lithium iodide (LiI), or any combination thereof. In some embodiments, the LiRAP material may be formed from LiOH and LiI.

The LiRAP material may be formed by solution deposition or any other suitable method. In particular, when a layer of LiRAP material is formed by solution deposition, a solution containing the precursor salts may be formed. The solution may include an oxygen-containing lithium salt (e.g., LiOH or $LiNO_3$), at a concentration of about 1M (i.e., 1 mole/liter). Depending on the application, the oxygen-containing lithium salt can be at concentration ranging from about 0.01M to about 2M. The solution may also contain a halogen salt of lithium (e.g., LiI), at a concentration of about 0.5M, for example, but it is to be appreciated that other concentration or amounts are possible as well. The ratio between oxygen-containing lithium salt and the hydrogen salt of lithium can be around 2:1, which is chosen based on empirical data to maximize ionic conductivity. Stoichiometrically, ratios of 2:1, 1:1, and 4:3 represent useful oxygen-containing lithium salt to the hydrogen salt of lithium ratios to achieve desired materials.

The solution may also contain a solvent or co-solvents. For example, water, methanol, and ethanol represent some of the solvents in which LiOH is soluble. For other lithium salts, butanol, dimethyl sulfoxide (DMSO), and/or dimethylformamide (DMF) can be used as a solvent. The type of solvent system is limited by the precursor with lowest solubility. In various embodiments, methanol and water are used as co-solvents.

Once prepared, the solution may be applied to a substrate. The solution may be coated on the substrate using, for example, a doctor blade or other suitable coating method. In some embodiments, the substrate may be a component of an EC device, such as a working electrode or a counter electrode. The deposited substrate may then be dried.

The dried substrate may then be thermally annealed at a temperature ranging from about 180° C. to 400° C., for a time period ranging from about 45 minutes to 3 days, to form a LiRAP layer/composition. In some embodiments, the dried substrate may be annealed at a temperature of about 330° C., for about 180 minutes, to form a LiRAP layer. The substrate may then be assembled with other components, to form an EC device.

EC Devices

FIGS. 1-5 are schematic views of EC devices, according to various embodiments of the present disclosure. It should be noted that such EC devices may be oriented upside down or sideways from the orientations illustrated in FIGS. 1-5. Furthermore, the thickness of the layers and/or size of the components of the devices in FIGS. 1-5 are not drawn to scale or in actual proportion to one another other, but rather are shown as representations.

Referring to FIG. 1, an exemplary EC device 100 may include opposing first and second substrates 102, 104. The first and second substrates 102, 104 may transparent substrates, such as substrates formed of glass or plastic. However, in some embodiments, the substrates 102, 104 may be omitted.

First and second transparent conductors 106, 108 may be respectively disposed on the first and second substrates 102, 104. A counter electrode 112 may be disposed on the first transparent conductor 106, and a working electrode 110 may be disposed on the second transparent conductor 108. A solid state electrolyte 114 may be disposed on the working electrode 110, and a LiRAP layer 120 may be disposed on the counter electrode 112.

The first and second transparent conductors 106, 108 may be formed from transparent conducting films fabricated using inorganic and/or organic materials. For example, the transparent conductors 106, 108 may include inorganic films of transparent conducting oxide (TCO) materials, such as indium tin oxide (ITO) or fluorine doped tin oxide (FTO). In other examples, organic films of transparent conductors 106, 108 may include graphene and/or various polymers.

The counter electrode 112 should be capable of storing enough charge to sufficiently balance the charge needed to cause visible tinting to the nanostructured transition metal oxide nanostructures in the working electrode 110. In various embodiments, the counter electrode 112 may be formed as a conventional, single component film, a nanostructured film, or a nanocomposite layer.

In some embodiments, the counter electrode 112 may be formed from at least one passive material that is optically transparent to both visible and NIR radiation during the applied biases. Examples of such passive counter electrode materials may include $CeO_2$, $CeVO_2$, $TiO_2$, indium tin oxide, indium oxide, tin oxide, manganese or antimony doped tin oxide, aluminum doped zinc oxide, zinc oxide, gallium zinc oxide, indium gallium zinc oxide, molybdenum doped indium oxide, $Fe_2O_3$, $V_2O_5$, or mixtures thereof. In other embodiments the counter electrode 112 may be formed from at least one complementary material, which may be transparent to NIR radiation but which may be oxidized in response to application of a bias, thereby causing absorption of visible light radiation. Examples of such complementary counter electrode materials may include $Cr_2O_3$, $MnO_2$, $FeO_2$, $CoO_2$, nickel oxide (e.g., $NiO_x$, where $1 \leq x \leq 1.5$, such as NiO), $RhO_2$, or $IrO_2$. The counter electrode materials may include a mixture of one or more passive materials and/or one or more complementary materials described above.

The LiRAP layer 120 may have a thickness of less than about 2 µm, such as a thickness of 300 nm or less, or a thickness ranging from about 2 to 200 nm.

The LiRAP layer 120 may be configured to stabilize the oxidation state of the counter electrode 112, which may aid in the retention of an electrical charge applied to the counter electrode 112. For example, when the counter electrode 112 includes NiO, the counter electrode 112 may be "charged" via ozonation, which may operate to convert the $Ni^{2+}$ to $Ni^{3+}$. The LiRAP layer 120 may be configured to prevent electrical interactions between the counter electrode 112 and the electrolyte 114, thereby reducing and/or preventing such interactions from reducing the Ni' back to Ni' in the nickel oxide, as would readily occur in the absence of the LiRAP layer 120. The LiRAP layer 120 may also prevent and/or reduce the generation of gas bubbles in the electrolyte 114 at the counter electrode 112, which may be due to side reactions between components of the electrolyte 114 and the counter electrode 112, during operation of the EC device 100.

In the various embodiments, the working electrode 110 may include doped or undoped transition metal oxide nanostructures 110A, and optionally transparent conducting oxide (TCO) nanostructures 110B, which are shown schematically as circles and hexagons for illustration purposes only. As discussed above, the thickness of the layers of the device 100, including and the shape, size and scale of nanostructures is not drawn to scale or in actual proportion to each other, but is represented for clarity. In the various embodiments, nanostructures 110A, 110B may be embedded in an optically transparent matrix material or provided as a packed or loose layer of nanostructures exposed to the electrolyte.

In the various embodiments, the doped transition metal oxide nanostructures 110A may be a ternary composition of the type AxMzOy, where M represents a transition metal ion species in at least one transition metal oxide, and A represents at least one dopant. Transition metal oxides that may be used in the various embodiments include, but are not limited to any transition metal oxide which can be reduced and has multiple oxidation states, such as niobium oxide, tungsten oxide, molybdenum oxide, vanadium oxide, titanium oxide and mixtures of two or more thereof. In one example, the transition metal oxide nanostructures may include doped or undoped tungsten oxide ($WO_{3-x}$) nanoparticles, where $0 \leq x \leq 0.33$, such as $0 \leq x \leq 0.1$.

In various embodiments, the at least one dopant species may be a first dopant species that, upon application of a particular first voltage range, causes a first optical response. The applied voltage may be, for example, a negative bias voltage. Specifically, the first dopant species may cause a surface plasmon resonance effect on the transition metal oxide by creating a significant population of delocalized electronic carriers. Such surface plasmon resonance may cause absorption of NIR radiation at wavelengths of around 780-2000 nm, with a peak absorbance at around 1200 nm. In various embodiments, the specific absorbances at different wavelengths may be varied/adjusted based other factors (e.g., nanostructure shape, size, etc.), discussed in further detail below. In the various embodiments, the first dopant species may be an ion species selected from the group of cesium, rubidium, and lanthanides (e.g., cerium, lanthanum, praseodymium, neodymium, promethium, samarium, europium, gadolinium, terbium, dysprosium, holmium, erbium, thulium, ytterbium, and lutetium).

In various embodiments, the dopant may include a second dopant species that causes a second optical response based upon application of a voltage within a different, second particular range. The applied voltage may be, for example, a negative bias voltage. In an embodiment, the second dopant species may migrate between the solid state electrolyte 114 and the transition metal oxide nanostructures of the working electrode 110, as a result of the applied voltage. Specifically, the application of voltage within the particular range may cause the second dopant species to intercalate and deintercalate the transition metal oxide nanostructures. In this manner, the second dopant may cause a change in the oxidation state of the transition metal oxide, which may cause a polaron effect and a shift in the lattice structure of the transition metal oxide. This shift may cause absorption of visible radiation, for example, at wavelengths of around 400-780 nm.

In various embodiments, the second dopant species may be an intercalation ion species selected from the group of lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In other embodiments, the second dopant species may include a charged proton species. For example, if the transition metal oxide nanostructures 110A are $WO_{3-x}$ nanoparticles, the dopant may be Li intercalated from the electrolyte 114.

In various embodiments, the TCO nanostructures 110B may optionally be mixed with the transition metal oxide nanostructures 110A in the working electrode 110. In the various embodiments, the TCO nanostructures 110B may include at least one TCO composition, which prevents UV radiation from reaching the electrolyte and generating electrons. In an example embodiment, the nanostructures 110B may include an indium tin oxide (ITO) composition, which may be a solid solution of around 60-95 wt % (e.g., 85-90 wt %) indium (III) oxide ($In^2O_3$) and around 5-40 wt % (e.g., 10-15 wt %) tin (IV) oxide ($SnO_2$). In another example embodiment, the TCO nanostructures 110B may include an aluminum-doped zinc oxide (AZO) composition, which may be a solid solution of around 99 wt % zinc oxide (ZnO) and around 2 wt % aluminum(III) oxide ($Al_2O_3$). Additional or alternative TCO compositions that may be used to form nanostructures 110B in the various embodiments include, but are not limited to, indium oxide, zinc oxide and other doped zinc oxides such as gallium-doped zinc oxide and indium-doped zinc oxide.

The TCO material of the nanostructures 110B may be transparent to visible light and, upon application of the first voltage, may modulate absorption of NIR radiation at wavelengths of around 1200-2500 nm, with peak absorbance around 2000 nm (e.g., at a longer peak wavelength than the transition metal oxide nanostructures 110A, but with overlapping absorption bands). In particular, application of the first voltage may cause an increase in free electron charge carriers, and therefore cause a surface plasmon resonance effect in at least one TCO nanostructures 110B. In an embodiment in which the TCO composition is ITO, the surface plasmon resonance effect may be caused by oscillation of free electrons produced by the replacement of indium ions ($In^{3+}$) with tin ions ($Sn^{4+}$). Similar to the transition metal oxide bronze, such surface plasmon resonance may cause a change in absorption properties of the TCO material. In some embodiments, the change in absorption properties may be an increase in absorbance of NIR radiation at wavelengths that overlaps with that of the nanostructures 110A. Therefore, the addition of TCO nanostructures 110B to the working electrode 110 may serve to expand the range of NIR radiation absorbed (e.g., at wavelengths of around 780-2500 nm) compared to that of the nanostructures 110A alone (e.g., at wavelengths of around 780-2000 nm), and to enhance absorption of some of that NIR radiation (e.g., at wavelengths of around 1200-2000 nm).

Based on these optical effects, the nanostructures 110A and optional nanostructures 110B of the working electrode 110 may progressively modulate transmittance of NIR and visible radiation as a function of applied voltage by operating in at least three different modes. For example, a first mode may be a highly solar transparent ("bright") mode in which the working electrode 110 is transparent to NIR radiation and visible light radiation. A second mode may be a selective-IR blocking ("cool") mode in which the working electrode 110 is transparent to visible light radiation but absorbs NIR radiation. A third mode may be a visible blocking ("dark") mode in which the working electrode 110 absorbs radiation in the visible spectral region and at least a portion of the NIR spectral region. In an example, application of a first voltage having a negative bias may cause the EC device to operate in the cool mode, blocking transmittance of NIR radiation at wavelengths of around 780-2500 nm. In another example, application of a second negative bias voltage having a higher absolute value than the first voltage may cause the EC device to operate in the dark state, blocking transmittance of visible radiation (e.g., at wavelengths of around 400-780 nm) and NIR radiation at wavelengths of around 780-1200 nm. In another example, application of a third voltage having a positive bias may cause the EC device to operate in the bright state, allowing transmittance of radiation in both the visible and NIR spectral regions. In various embodiments, the applied voltage may be between −5V and 5V, preferably between −2V and 2V. For example, the first voltage may be −0.25V to −0.75V, and the second voltage may be −1V to −2V. In another example, the absorbance of radiation at a wavelength of 800-1500 nm by the EC device may be at least 50% greater than its absorbance of radiation at a wavelength of 450-600 nm.

Alternatively, the nanostructures 110A and optional nanostructures 110B of the working electrode 110 may modulate transmittance of NIR and visible radiation as a function of applied voltage by operating in two different modes. For example, a first mode may be a highly solar transparent ("bright") mode in which the working electrode 110 is transparent to NIR radiation and visible light radiation. A second mode may be a visible blocking ("dark") mode in which the working electrode 110 absorbs radiation in the visible spectral region and at least a portion of the NIR spectral region. In an example, application of a first voltage having a negative bias may cause the EC device to operate in the dark mode, blocking transmittance of visible and NIR radiation at wavelengths of around 780-2500 nm. In another example, application of a second voltage having a positive bias may cause the EC device to operate in the bright mode, allowing transmittance of radiation in both the visible and NIR spectral regions. In various embodiments, the applied voltage may be between −2V and 2V. For example, the first voltage may be −2V, and the second voltage may be 2V.

In various embodiments, the shape, size, and doping levels of nanostructured transition metal oxide nanostructures may be tuned to further contribute to the spectral response by the device. For instance, the use of rod versus spherical nanostructures 110A may provide a wider level of porosity, which may enhance the switching kinetics. Further, a different range of dynamic plasmonic control may occur for nanostructures with multiple facets, such as at least 20 facets.

Various embodiments may also involve alternation of the nanostructures 110A that form the working electrode 110. For example, the nanostructures may be nanoparticles of various shapes, sizes and/or other characteristics that may influence the absorption of NIR and/or visible light radiation. In some embodiments, the nanostructures 110A may be isohedrons that have multiple facets, preferably at least 20 facets.

In some embodiments, the transition metal oxide nanostructures 110A may be a combination of nanoparticles having a cubic unit cell crystal lattice ("cubic nanoparticles") and nanoparticles having a hexagonal unit cell crystal lattice ("hexagonal nanoparticles"). Each unit cell type nanoparticle contributes to the performance of the working electrode 110. For example, the working electrode 110 may include both cubic and hexagonal cesium doped tungsten oxide bronze nanoparticles. In alternative embodiments, the working electrode 110 may include either cubic or hexagonal cesium doped tungsten oxide nanoparticles. For example, the working electrode 110 may include cubic cesium-doped tungsten oxide (e.g. $Cs_1W_2O_{6-x}$) nanoparticles and amorphous niobium oxide nanoparticles or hexagonal cesium-doped tungsten oxide (e.g. $Cs_{0.29}W_1O_3$) nanoparticles without niobium oxide. In alternative embodiments, the working electrode 110 may include undoped cubic tungsten oxide (e.g. $WO_{3-x}$) nanoparticles where $0 \leq X \leq 0.1$.

In some embodiments, the working electrode and/or the counter electrode may additionally include at least one material, such as an amorphous nanostructured material, that enhances spectral absorption in the lower wavelength range of the visible region. In some embodiments, the at least one amorphous nanostructured material may be at least one nanostructured amorphous transition metal oxide.

In particular, the amorphous nanostructured materials may provide color balancing to the visible light absorption that may occur due to the polaron-type shift in the spectral absorption of the doped-transition metal oxide bronze. As discussed above, upon application of the second voltage having a higher absolute value, the transition metal oxide bronze may block (i.e., absorb) radiation in the visible range. In various embodiments, the absorbed visible radiation may have wavelengths in the upper visible wavelength range (e.g., 500-700 nm), which may cause the darkened layer to appear blue/violet corresponding to the un-absorbed lower visible wavelength range (e.g., around 400-500 nm). In various embodiments, upon application of the second voltage, the at least one nanostructured amorphous transition metal oxide may absorb complementary visible radiation in the lower visible wavelength range (e.g., 400-500 nm), thereby providing a more even and complete darkening across the visible spectrum with application of the second voltage. That is, use of the amorphous nanostructured material may cause the darkened layer to appear black.

In some embodiments, at least one nanostructured amorphous transition metal oxide may be included in the working electrode 110 in addition to the doped-transition metal oxide nanostructures 110A and the optional TCO nanostructures 110B. An example of such material in the working electrode 110 may be, but is not limited to, nanostructured amorphous niobium oxide, such as NbO, $NbO_2$, or $Nb_2O_5$. In some embodiments, the counter electrode 112 may include, as a complementary material, at least one nanostructured amorphous transition metal oxide. That is, in addition to optically passive materials, the counter electrode 112 may include at least one material for color balancing (i.e., complementing) the visible radiation absorbed in the working electrode (i.e., by the transition metal oxide bronze. An example of such material in the counter electrode 112 may be, but is not limited to, nanostructured amorphous nickel oxide, such as nickel (II) oxide (NiO) or other nickel oxide materials (e.g., $NiO_x$).

In the various embodiments, nanostructures that form the working and/or counter electrode, including the at least one amorphous nanostructured material, may be mixed together in a single layer. An example of a mixed layer is shown in FIG. 1 with respect to transition metal oxide nanostructures 110A and TCO nanostructures 110B. Alternatively, nanostructures that form the working and/or counter electrode, including the at least one amorphous nanostructured material, may be separately layered according to composition. For example, a working electrode may include a layer of amorphous NbO nanostructures, a layer of transition metal oxide bronze nanostructures, and a layer of ITO nanostructures, in any of a number of orders.

In various embodiments, the electrolyte 114 may be a solid state electrolyte including a polymer material and a plasticizer material, such that electrolyte 114 may permeate into crevices between the transition metal oxide nanostructures 110A (and/or nanostructures 110B if present). The term "solid state," as used herein with respect to the electrolyte 114, refers to a polymer-gel and/or any other non-liquid material. In some embodiments, the solid state electrolyte 114 may further include a salt containing, for example, an ion species selected from the group of lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In an example embodiment, such salt in the electrolyte 114 may contain a lithium and/or sodium ions. In some embodiments, the solid state electrolyte 114 may initially contain a solvent, such as butanol, which may be evaporated off once the EC device 100 is assembled. In some embodiments, the electrolyte 114 may be around 40-60 wt % plasticizer material, preferably around 50-55 wt % plasticizer material. In an embodiment, the plasticizer material may include at least one of tetraglyme and an alkyl hydroperoxide. In an embodiment, the polymer material of the solid state electrolyte 114 may be polyvinylbutyral (PVB), and the salt may be lithium bis (trifluoromethane). In other embodiments, the electrolyte 114 may include at least one of lithium phosphorus oxynitride (LiPON) and tantalum pentoxide ($Ta_2O_5$).

In some embodiments, the electrolyte 114 may include a sacrificial redox agent (SRA). Suitable classes of SRAs may include, but are not limited to, alcohols, nitrogen heterocycles, alkenes, and functionalized hydrobenzenes. Specific examples of suitable SRAs may include benzyl alcohol, 4-methylbenzyl alcohol, 4-methoxybenzyl alcohol, dimethylbenzyl alcohol (3,5-dimethylbenzyl alcohol, 2,4-dimethylbenzyl alcohol etc.), other substituted benzyl alcohols, indoline, 1,2,3,4-tetrahydrocarbazole, N,N-dimethylaniline, 2,5-dihydroanisole, etc. In various embodiments, the SRA molecules may create an air stable layer that does not require an inert environment to maintain charge.

Polymers that may be part of the electrolyte 114 may include, but are not limited to, poly(methyl methacrylate) (PMMA), poly(vinyl butyral-co-vinyl alcohol-co-vinyl acetate) (PVB), poly(ethylene oxide) (PEO), fluorinated co-polymers such as poly(vinylidene fluoride-co-hexafluoropropylene), poly(acrylonitrile) (PAN), poly(vinyl alcohol) (PVA), etc. Plasticizers that may be part of the polymer electrolyte formulation include, but are not limited to, glymes (tetraglyme, triglyme, diglyme etc.), propylene carbonate, ethylene carbonate, ionic liquids (1-ethyl-3-methylimidazolium tetrafluoroborate, 1-butyl-3-methylimidazolium hexafluorophosphate, 1-butyl-3-methylimidazolium bis(trifluoromethane sulfonyl) imide, 1-butyl-1-methyl-pyrrolidinium bis(trifluoromethane sulfonyl)imide, etc.), N,N-dimethylacetamide, and mixtures thereof.

In some embodiments, the electrolyte 114 may include, by weight, 10-30% polymer, 40-80% plasticizer, 5-25% lithium salt, and 0-10% SRA.

Figure 2:
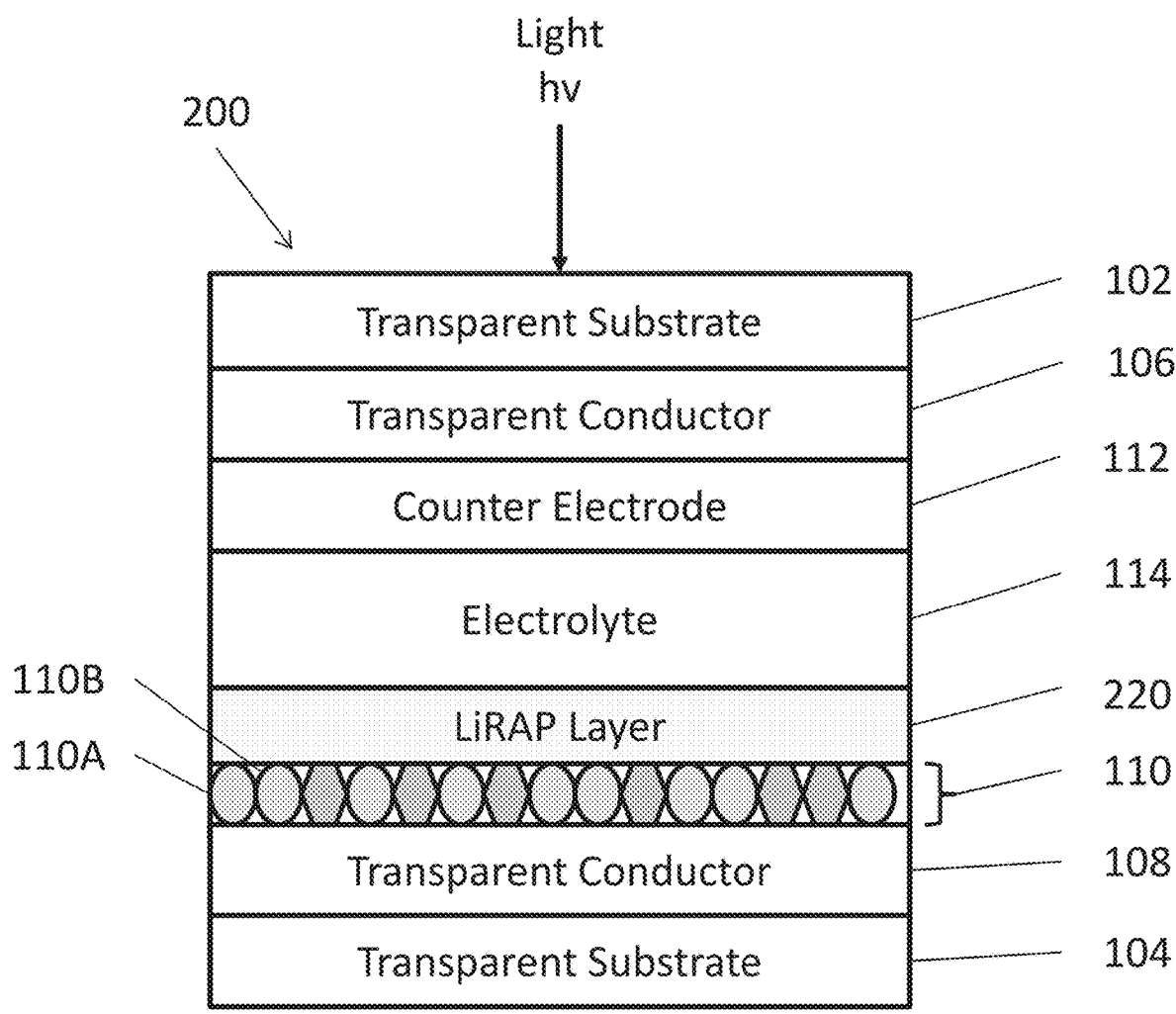

FIG. 2 is a schematic view of an EC device 200, according to various embodiments of the present disclosure. The EC device 200 is similar to the EC device 100, so only the differences therebetween will be discussed in detail.

Referring to FIG. 2, the EC device 200 includes a LiRAP layer 220 disposed between the electrolyte 114 and the working electrode 110. The LiRAP layer 220 may have a thickness as described above with respect to the LiRAP layer 120 of FIG. 1.

The LiRAP layer 220 may be configured to physically separate the working electrode 110 from the electrolyte 114, such that the side reactions between the working electrode 110 and the electrolyte may be suppressed. In other words, the LiRAP layer 220 may be disposed directly between the electrolyte 114 and the working electrode 110.

Without being bound to any particular theory, it is believed that the migration of intercalation ions between the electrolyte 114 and the working electrode 110 is responsible for at least some of the device's capability to modulate spectral absorption. Therefore, in order to maintain operability of the device, the LiRAP material used to form the LiRAP layer 220 should also be ionically conductive. That is, the material of the LiRAP layer 220 may operate to block free electrons in the solid state electrolyte 114 from reducing the transition metal oxide nanostructures 110A of the working electrode 110, while allowing the diffusion of ions of an intercalation dopant species (e.g., Na, Li, etc.) between the electrolyte 114 and working electrode 110. In this manner, degradation of the transition metal oxide nanostructures 110A is reduced or prevented by controlling the effect of the absorbed UV radiation in addition to or instead of instead of blocking its absorption.

Accordingly, the LiRAP layer 220 may be electrically insulating. As such, the LiRAP layer may be configured to prevent free electron charge carriers from contacting the working electrode 110, such that the charge carriers may be prevented from electrochemically reducing the transition metal oxide nanostructures 110A. Therefore, the LiRAP layer 220 may prevent and/or reduce unwanted photochromic darkening of the working electrode 110. Further, the LiRAP layer 220 may be ionically conductive to permit proper operating of the EC device 200.

Figure 3:
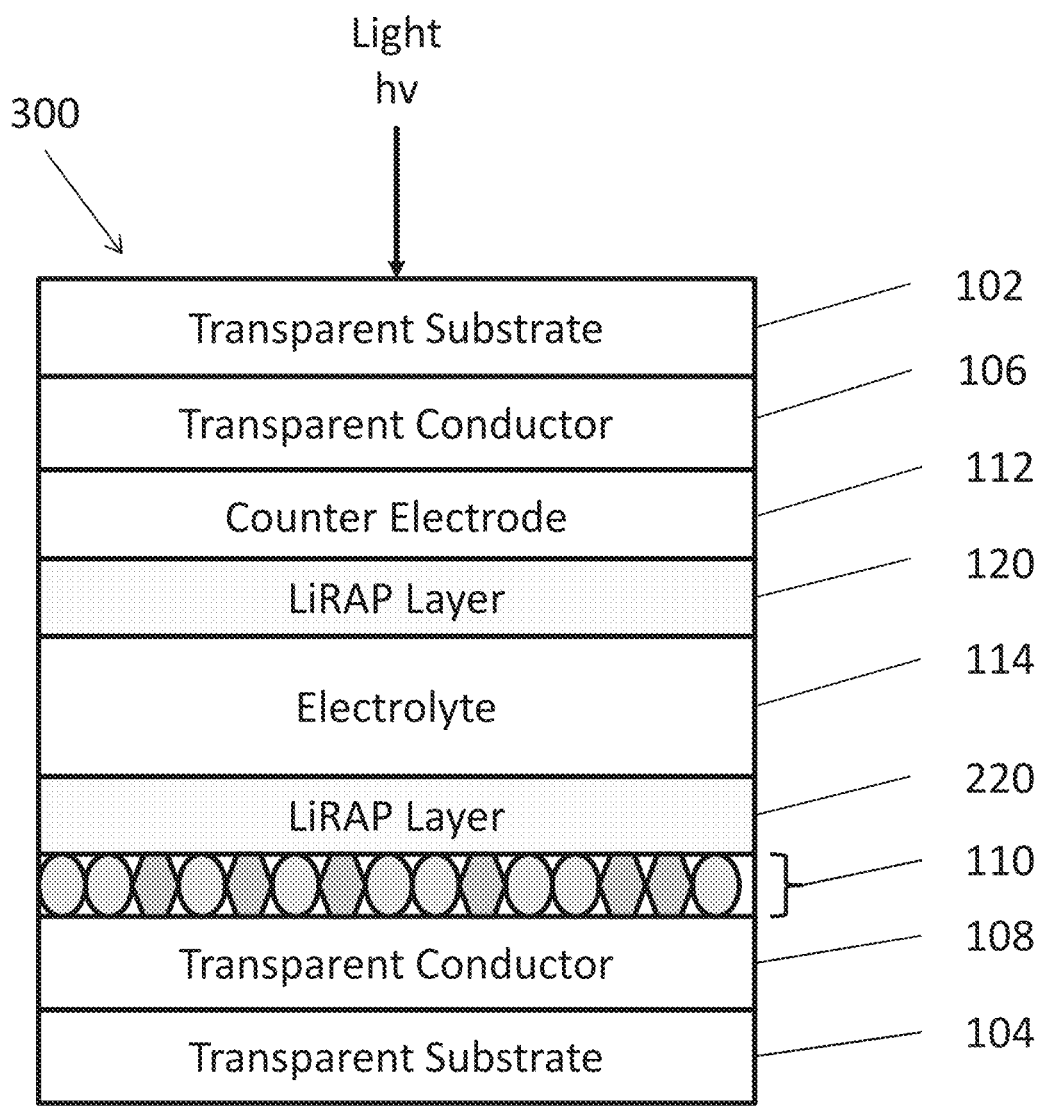

FIG. 3 is a schematic view of an EC device 300, according to various embodiments of the present disclosure. The EC device 300 is similar to the EC devices 100, 200, so only the differences therebetween will be discussed in detail.

Referring to FIG. 3, the EC device 300 includes the LiRAP layer 120 disposed between the counter electrode 112 and the electrolyte 114. The EC device 300 also includes the LiRAP layer 220 disposed between the working electrode 110 and the electrolyte 114. Accordingly, both the working electrode 110 and the counter electrode 112 are protected from the above-described side reactions with the electrolyte 114, such as gas bubble generation, charge reduction, and/or photo-chromic darkening.

Figure 4:
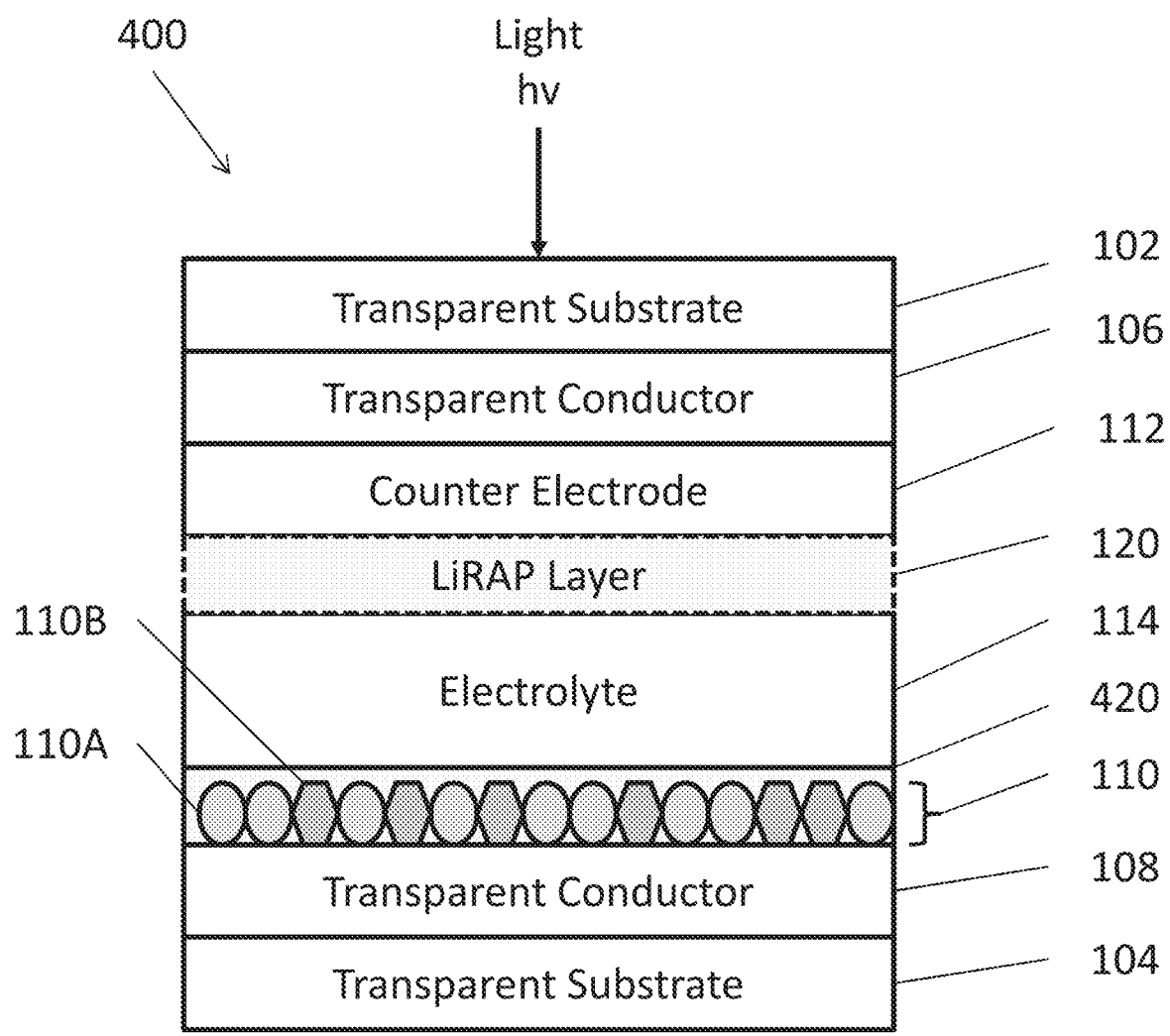

FIG. 4 is a schematic view of an EC device 400, according to various embodiments of the present disclosure. The EC device 400 is similar to the EC device 100, so only the differences therebetween will be discussed in detail.

Referring to FIG. 4, the EC device 400 includes a LiRAP material 420 in which the working electrode 110 is disposed. In one embodiment, the LiRAP material 420 may be in the form of a matrix layer that surrounds the nanostructures 110A (and optionally 110B) of the working electrode 110. In an alternative embodiment, the LiRAP material 420 may be mixed with the working electrode 110 to form a composite working electrode. In another alternative embodiment, the LiRAP material 420 may surround the nanostructures 110A (and optionally 110B) in a core-shell configuration. In other words, the LiRAP material 420 may be in the form of shells that surround each of the nanostructures 110A (and optionally 110B). The shells may be formed on nanoparticle core structures, and the resulting core-shell nanoparticles may be introduced into an EC device. As such, the working electrode 110 may be protected from unwanted side reactions with components of the electrolyte 114. In some embodiments, the LiRAP material 420 and the working electrode 110 may be formed by depositing a mixture, such as an ink, comprising the nanostructures 110A (and optionally 110B) and LiRAP precursors, on the transparent conductor 108 and then converting the LiRAP precursors to a LiRAP material after deposition. In other embodiments, the LiRAP material 420 and the working electrode 110 may be formed by depositing a mixture, such as an ink, comprising the nanostructures 110A (and optionally 110B) and a LiRAP material (which is already formed from the LiRAP precursors in a prior step) on the transparent conductor 108. In some embodiments, the LiRAP precursors may include $LiNO_3$ and LiI.

The EC device may also optionally include a LiRAP layer 120 disposed between the electrolyte 114 and the counter electrode 112 or a LiRAP material mixed with the counter electrode 112. The LiRAP layer 120 may be formed by depositing a precursor mixture (e.g., precursor ink) comprising $LiNO_3$ and LiI on the counter electrode 112 and converting the precursors to a LiRAP layer, or by depositing LiRAP precursors or a LiRAP material together with the counter electrode 112 material to form a composite LiRAP—counter electrode layer. In one embodiment, if the counter electrode 112 material comprises nanostructures, then the LiRAP material can form a matrix in which nanostructures of the counter electrode are disposed, the LiRAP material and the nanostructures of the counter electrode form a composite counter electrode, or the LiRAP material forms shells around the nanostructures of the counter electrode. Accordingly, the counter electrode 112 may be protected from unwanted side reactions with components of the electrolyte 114.

Figure 5:
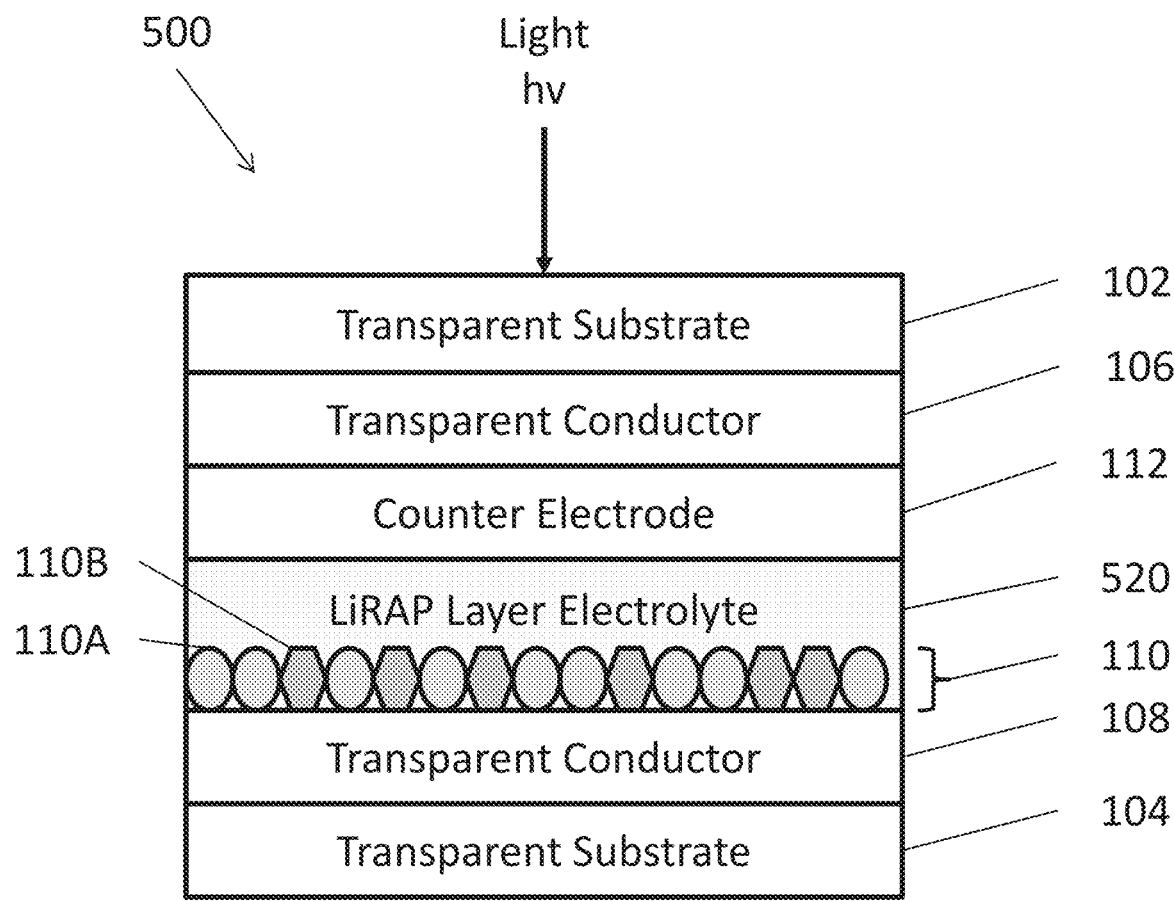

FIG. 5 is a schematic view of an EC device 500, according to various embodiments of the present disclosure. The EC device 500 is similar to the EC device 400, so only the differences therebetween will be discussed in detail.

Referring to FIG. 5, the EC device 500 includes a LiRAP layer 520 disposed between the working electrode 110 and the counter electrode 112. The LiRAP layer may operate as an electrolyte of the EC device 500. As such, the EC device 500 does not include a solid state polymer electrolyte, as discussed above with regard to FIGS. 1-4. In other words, the LiRAP layer 520 is disposed directly between the working electrode 110 and the counter electrode 112. Accordingly, the LiRAP layer 520 may be referred to as an LiRAP layer electrolyte. The LiRAP layer 520 may have a thickness of about 20 µm or less, such as a thickness ranging from about 20 µm to about 5 µm, from about 18 µm to about 10 µm, or about 16 µm to about 12 µm.

In some embodiments, the LiRAP layer 520 may be disposed in contact with a surface of the working electrode 110 that faces the counter electrode 112. In other embodiments, the LiRAP layer 520 may impregnate the working electrode 110, such that the LiRAP layer 520 forms a matrix around the nanostructures 110A and optionally 110B of the working electrode 110.

The LiRAP layer 520 may be free or substantially free of organic compounds. As such, the LiRAP layer 520 may prevent or reduce the generation of gas bubbles at the working and/or counter electrodes 110, 112. The LiRAP layer 520 may also prevent and/or suppress photochromic darkening of the working electrode 110. Further, the LiRAP layer 520 may improve the operational voltage and/or reduce a transmissive state change time period of the EC device.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. A method of making an electrochromic (EC) device, comprising:
    providing a light transmissive first substrate;
    providing a precursor mixture comprising an oxygen-containing lithium salt, a halogen salt of lithium, and tungsten oxide nanoparticles, and a solvent on the first substrate;
    annealing the precursor mixture to form a working electrode on the first substrate;
    providing a light transmissive second substrate;
    forming a counter electrode on the second substrate; and
    forming a solid state electrolyte including a polymer material between the counter electrode and the working electrode.

2. The method of claim 1, wherein:
    the oxygen-containing lithium salt comprises lithium hydroxide (LiOH), lithium acetate ($C_2H_3LiO_2$), lithium carbonate ($Li_2CO_3$), lithium oxide ($Li_2O$), lithium perchlorate ($LiClO_4$), lithium nitrate ($LiNO_3$), or a combination thereof; and the halogen salt of lithium comprises lithium chloride (LiCl), lithium bromide (LiBr), lithium fluoride (LiF), lithium iodide (LiI), or a combination thereof.

3. The method of claim 1, wherein the oxygen-containing lithium salt comprises $LiNO_3$ and the halogen salt of lithium comprises LiI.

4. The method of claim 1, wherein the oxygen-containing lithium salt comprises lithium hydroxide (LiOH), lithium acetate ($C_2H_3LiO_2$), lithium carbonate ($Li_2CO_3$), lithium oxide ($Li_2O$), lithium perchlorate ($LiClO_4$), lithium nitrate ($LiNO_3$), or a combination thereof.

5. The method of claim 1, wherein the oxygen-containing lithium salt comprises $LiNO_3$.

6. The method of claim 1, wherein the halogen salt of lithium comprises lithium chloride (LiCl), lithium bromide (LiBr), lithium fluoride (LiF), lithium iodide (LiI), or a combination thereof.

7. The method of claim 1, wherein the halogen salt of lithium comprises LiI.

\* \* \* \* \*